(12) United States Patent
Fuchigami et al.

(10) Patent No.: US 6,276,366 B1
(45) Date of Patent: Aug. 21, 2001

(54) ROD-SHAPED TEST-PIECE TESTING APPARATUS

(75) Inventors: Seiji Fuchigami; Hiroshi Obara; Hiroshi Sasaki; Kazuhito Araki, all of Tokyo; Takayuki Kawai, Toyohashi, all of (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 09/377,816

(22) Filed: Aug. 20, 1999

Related U.S. Application Data

(63) Continuation of application No. PCT/JP99/01254, filed on Mar. 15, 1999.

(30) Foreign Application Priority Data

Jul. 22, 1998 (JP) .................................................. 10-206910
Jul. 22, 1998 (JP) .................................................. 10-206911

(51) Int. Cl.[7] .............................. A24C 5/32; A24C 5/34
(52) U.S. Cl. .................... 131/280; 131/904; 131/905; 131/906; 131/907; 131/908; 73/38
(58) Field of Search ............................. 131/904, 905, 131/906, 907, 908, 280; 73/38

(56) References Cited

U.S. PATENT DOCUMENTS

| | | | |
|---|---|---|---|
| 4,326,542 | * 4/1982 | Laszlo et al. | 131/906 |
| 4,865,051 | * 9/1989 | Federle et al. | 131/904 |
| 4,955,398 | * 9/1990 | Milner et al. | 131/904 |
| 5,214,969 | * 6/1993 | Adkins et al. | 73/38 |
| 5,695,070 | * 12/1997 | Draghetti | 131/908 |

FOREIGN PATENT DOCUMENTS

| | | | |
|---|---|---|---|
| 638614 | * 9/1983 | (CH) | 131/904 |
| 1423167 | * 4/1969 | (DE) | 131/906 |
| 2448669 | * 4/1976 | (DE) | 131/906 |
| A1-148903 | 6/1989 | (JP) . | |
| A5- 40015 | 2/1993 | (JP) . | |
| A8- 29133 | 2/1996 | (JP) . | |

\* cited by examiner

*Primary Examiner*—Michael P. Colaianni
(74) *Attorney, Agent, or Firm*—Birch, Stewart, Kolasch & Birch, LLP

(57) ABSTRACT

A cigarette testing apparatus includes a ventilation-characteristic measuring section having a ventilation vessel which is disposed horizontally so as to reduce the vertical dimension of the apparatus. A cigarette is supplied in a horizontal position from a cigarette supplying section to a weight measuring section where the cigarette weight is measured. The cigarette ejected therefrom is transferred to a circumference measuring section, a ventilation-characteristic measuring section and a length/hardness measuring section in this order in a condition that the horizontal position is kept unchanged. In these sections, the circumference, ventilation characteristic, length and hardness of the cigarette are measured in sequence.

6 Claims, 13 Drawing Sheets

ROD-SHAPED TEST-PIECE TESTING APPARATUS

This is a continuation application of PCT/JP99/01254 filed Mar. 15, 1999 designating the United States for the national phase.

BACKGROUND OF THE INVENTION

1. Technical Field

The present invention relates to a rod-shaped test-piece testing apparatus, and more particularly, to a cigarette testing apparatus suited to evaluate qualities of a cigarette and having a simplified construction.

2. Related Arts

To evaluate qualities of a cigarette, testing is made on various items such as the weight, circumference and length of the cigarette, the hardness of a cigarette portion of the cigarette, and ventilation characteristics of cigarette and filter portions of the cigarette.

As schematically shown in FIG. 1, a cigarette testing apparatus of this kind comprises a stocker 1 for supplying cigarettes, a weight measuring section 2 for measuring the weight of a cigarette, a circumference measuring section 3 for optically measuring the circumference of a cigarette, a ventilation-characteristic measuring section 4, having a ventilation vessel, for measuring ventilation characteristics of a cigarette, a length/hardness measuring section 5 for measuring the length and hardness of a cigarette, and an ejection box 6 to which a cigarette having been tested is ejected. In FIG. 1, both the front view and the side view of the circumference measuring section 3 are shown.

Cigarettes received in the stocker 1 are supplied in a horizontal position one by one to the weight measuring section 2 by means of a supply mechanism 11. The cigarette having been subjected to a weight measurement is laterally delivered and rolled by a transfer mechanism 12, to be transferred onto rollers 3a of the circumference measuring section 3. The cigarette having been subjected to a circumference measurement while being rotated on the rollers 3a is delivered by a pusher 13 in the axial direction of the rollers 3a, and is held by a rotary holder 14. With rotation of the rotary holder 14, the cigarette is changed over to a vertical position and is caused to fall into the ventilation vessel 4a of the ventilation-characteristic measuring section 4. After completion of a ventilation characteristic measurement performed with the cigarette held in place in the ventilation vessel 4a, the cigarette is caused to fall from the ventilation vessel 4a.

A rotary holder 15 for receiving the cigarette is disposed beneath the ventilation vessel 4a, so that the cigarette is held in a vertical position in the rotary holder 15. In this state, a length measurement is carried out. Thereafter, with rotation of the rotary holder 15, the cigarette is changed over to a horizontal position, and is transferred by a pusher 16 onto a measuring stage 5a where a hardness measurement is carried out. The cigarette having been subjected to the hardness measurement is laterally ejected from the measuring stage 5a to be dropped into the ejection box 6.

In the case of the cigarette testing apparatus having the above-mentioned construction, the direction of a cigarette must be changed in accordance with arrangements (specifications) of the measuring sections 2, 3, 4 and 5. Particularly, in order to transfer a cigarette from the circumference measuring section 3, in which the cigarette is subject to the circumference measurement while being rotated on the rollers 3a, to the ventilation vessel 4a, the direction of the cigarette must be changed to a vertical position with use of the rotary holder 14. Moreover, another rotary holder 15 must be used to change the direction of a cigarette to a horizontal position in order to transfer a cigarette discharged from the ventilation vessel 4a onto the measuring stage 5a.

The provision of the two rotary holders 14 and 15 for changing the direction of a cigarette is a cause of making the construction of the testing apparatus complicated. For the installation of the measuring sections 2, 3, 4 and 5 of the cigarette testing apparatus, a sufficient margin of space is required because the supply of a cigarette to the ventilation vessel 4a must be made from above and the discharge of a cigarette from the ventilation vessel must be made in the downward direction. As a result, the height of the testing apparatus becomes large, to make it difficult to handle the stocker which is mounted to an uppermost part of the testing apparatus.

With regard to the cigarette length measurement, as described in Japanese provisional patent publication no. 1-148902 and as with the case of the cigarette testing apparatus shown in FIG. 1, a stopper adapted to abut against one end of a cigarette is provided in a transfer path (passage) in which the cigarette is held in a vertical position and through which the cigarette falls. In the cigarette length measurement, the position of another end of the cigarette positioned by the stopper is optically detected with use of a photosensor.

Because the length and the diameter (thickness) of a cigarette vary depending on a cigarette brand, the positions of the stopper and the photosensor, for instance, must be adjusted in accordance with abrand of a cigarette to be measured. Moreover, a vertical position of a cigarette subjected to the length measurement must be regulated, e.g., by adapting the inner diameter of a cigarette transfer path (a holder, for instance) to the thickness of a cigarette to be measured. Actually however, the cigarette thickness varies among individual cigarettes and this variation can make the inner diameter of the transfer path inappropriate. By using the transfer path (holder) having the inner diameter suited to the thickness of a typical cigarette, it is difficult to always accurately hold a respective cigarette in a vertical position.

Furthermore, in order to position a cigarette which vertically falls during the course of transfer, one end of the cigarette is caused to abut against a stopper, and at this time tobacco shreds in the cigarette are compressed by a falling inertia force, resulting in a so-called packing. As a consequence, the length of the cigarette changes, to make it impossible to carry out an accurate length measurement.

SUMMARY OF THE INVENTION

An object of the present invention is to provide a rod-shaped test-piece testing apparatus which has a simplified whole arrangement and a reduced vertical size and which is highly practical in use.

Another object of the present invention is to provide a rod-shaped test-piece testing apparatus capable of easily and accurately measuring the length of a rod-shaped test piece irrespective of the thickness or diameter of the test piece.

According to the present invention, there is provided a rod-shaped test-piece testing apparatus which comprises a test-piece supplying section for horizontally supplying test pieces one by one, a first measuring section, having a first measuring stage on which a test piece supplied from the test-piece supplying section is held horizontally, for making a measurement on a first test item for the test piece, with the test piece held on the first measuring stage, a second measuring section, having a second measuring stage comprised of a ventilation vessel which is placed horizontally and adapted to form airtight chambers, for making a measurement on a ventilation characteristic as a second test item for the test piece, with the test piece held horizontally in the ventilation vessel, a third measuring section, having a third measuring stage on which the test piece is held horizontally, for making a measurement on a third test item for the test piece, with the test piece held on the third measuring stage, a first transfer section for horizontally transferring the test piece from the first measuring section to the second measuring section, and a second transfer section for horizontally transferring the test piece from the second measuring section to the third measuring section.

With the testing apparatus of this invention, measurements on the first, second and third test items can be carried out in a condition that a test piece is held horizontally at the first, second and third measuring sections having horizontally placed measuring stages, respectively. This eliminates the need for the provision of turnabout mechanisms such as rotary holders or reduces the number of rotary holders, whereby the construction of the test-piece testing apparatus can be simplified. Furthermore, the need of transferring a test piece in a height direction of the testing apparatus in a condition that the test piece is held in a vertical position is eliminated, whereby the height dimension of the testing apparatus can be reduced. This makes it possible to lower an installation height level of the test-piece supplying section, whereby an operation of filling additional test pieces into the test-piece supplying section can be made with ease.

In the present invention, preferably, the first measuring section includes a weight measuring section, having a weighing stage on which the test piece supplied from the test-piece supplying section is held horizontally, for measuring a weight of the test piece on the weighing stage, a circumference measuring section, having a circumference measuring stage on which the test piece is held horizontally, for measuring a circumference of the test piece on the circumference measuring stage, and a subsidiary transfer mechanism for laterally delivering the test piece from the weighing stage of the weight measuring section and for transferring the test piece onto the circumference measuring stage of the circumference measuring section. The third measuring section includes a length/hardness measuring section for measuring a length and hardness of the test piece on a length/hardness measuring stage which is placed horizontally. The first transfer section transfers the test piece from the circumference measuring stage to the second measuring section.

With the just-mentioned preferred arrangement, measurements on various test items including the weight, circumference, ventilation characteristics, length and hardness of a test piece can be made in such a manner that qualities of the test piece are satisfactorily evaluated, even with use of the test-piece testing apparatus in which the first, second and third measuring sections are arranged horizontally so as to provide a simplified construction and a reduced height dimension.

Preferably, the length/hardness measuring section comprises a regulating member for regulating a position of one end of the test piece on the length/hardness measuring stage, and a sensor for optically detecting a position of another end of the test piece which is placed on the length/hardness measuring stage, with the position of the one end of the test piece regulated by the regulating member, to thereby measure the length of the test piece.

With this preferred arrangement, the length of the test piece can be measured in a condition that the posture or direction of the test piece is kept constant, i.e., the test piece is kept in a horizontal position, whereby the length measurement can be made simply, stably and reliably irrespective of the diameter of the test piece. In addition, the test piece end to be subject to the length measurement can be positioned within a sensing region of a photosensor by changing the position of the test piece regulated by the regulating member in accordance with a standard test-piece length. This makes it possible to carry out an accurate length measurement by effectively using a low-priced photosensor which has a narrow sensing region.

More preferably, the length/hardness measuring stage is comprised of a pair of revolving rollers which are horizontally disposed in parallel to each other. With this preferred arrangement, a cigarette as a test piece can be rotated in a circumferential direction of the cigarette by rotatively driving the revolving rollers in a state that the cigarette is placed on the revolving rollers, whereby the cigarette can be subjected to a hardness measurement in a condition that the direction or circumferential position of a lap portion of the cigarette is regulated. As a result, a constant cigarette portion (the lap portion or a cigarette circumferential portion other than the lap portion) can be subjected to the hardness measurement, whereby an error in hardness measurement caused by variations in cigarette portion subjected to the hardness measurement can be reduced and hence a stable hardness measurement on cigarettes can be achieved.

DETAILED DESCRIPTION

With reference to the appended drawings, a cigarette quality testing apparatus equipped with a cigarette testing apparatus according to an embodiment of the present invention will be explained hereinbelow.

Whole Arrangement

Figure 2:
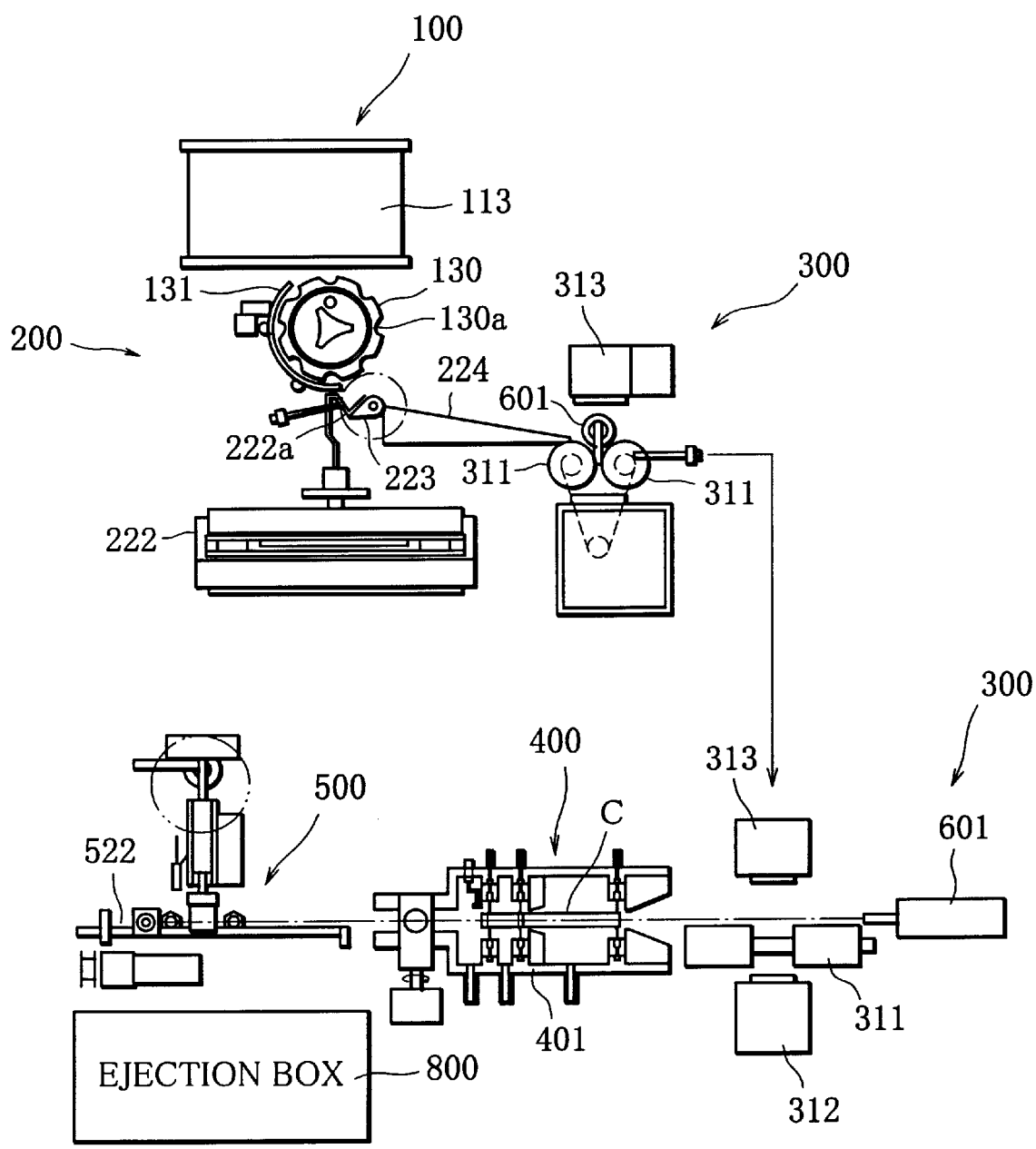
FIG. 2 is a schematic view showing a cigarette testing apparatus according to an embodiment of the present invention.

As shown in FIG. 2, the cigarette testing apparatus according to an embodiment of the present invention comprises a cigarette supplying section 100 for supplying a cigarette C as a test piece, a weight measuring section 200 for measuring the weight of the cigarette, a circumference measuring section 300 for measuring the diameter or the circumference of the cigarette, and a ventilation-characteristic measuring section 400, having a ventilation vessel 401, for measuring ventilation characteristics and ventilation resistance of the cigarette, and a length/hardness measuring section 500 for measuring the length and the hardness of the cigarette. In FIG. 2, a front view of the circumference measuring section 300 is shown together with the cigarette supplying section 100 and the weight measuring section 200, and a side view of the circumference measuring section 300 is shown together with the ventilation-characteristic measuring section 400 and the length/hardness measuring section 500..

These apparatus sections 100, 200, 300, 400 and 500 operate under the control of a control section 700 (FIG. 5) equipped with a microprocessor and the like. The control section 700 is comprised of output ports through which various control signals are delivered, and input ports through which detection signals and pieces of detection data are received. In FIG. 2, reference numeral 800 denotes an ejection box for receiving cigarettes having been subjected to the measurements or testing.

Figure 3:
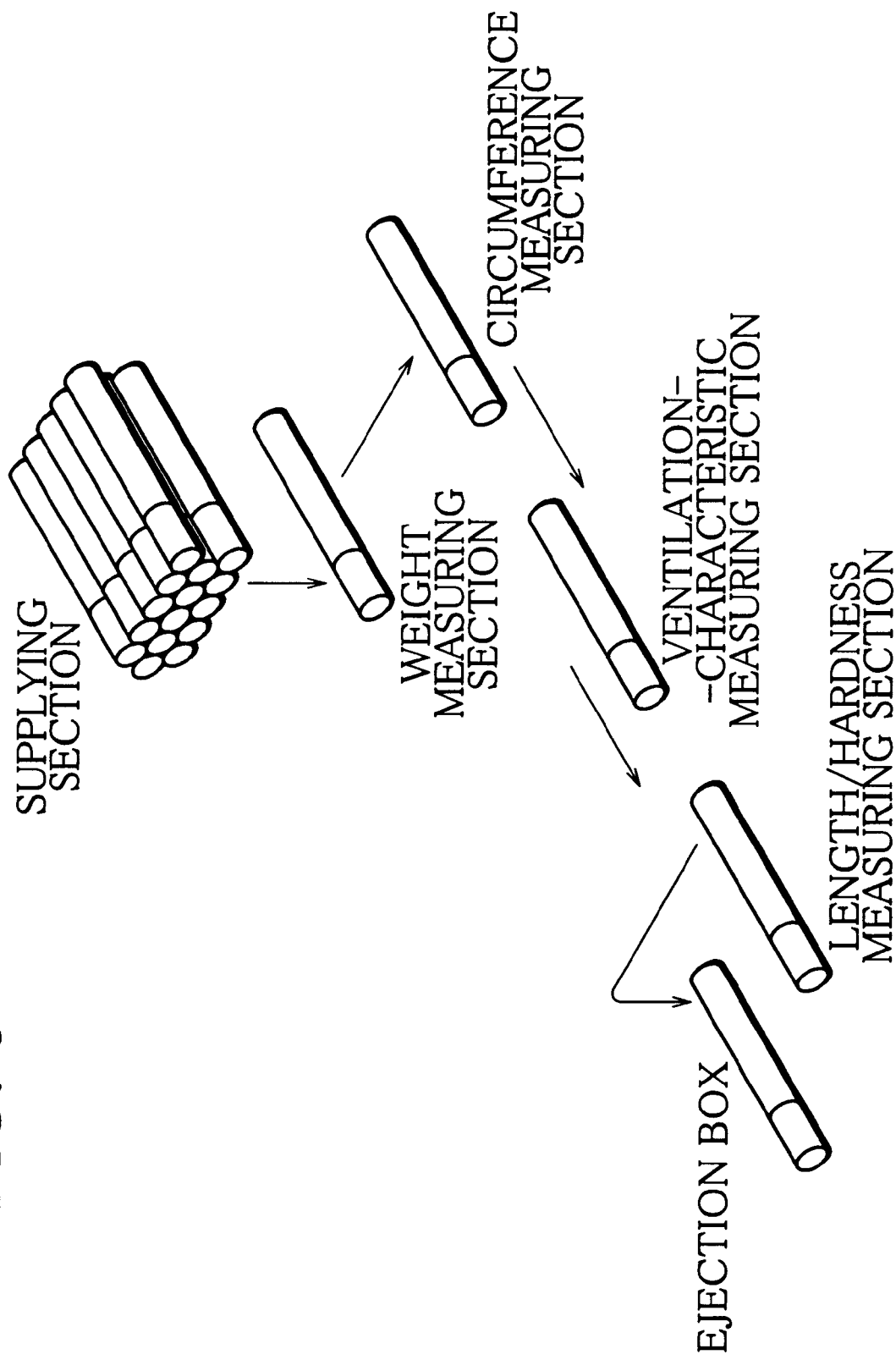
FIG. 3 is a view diagramatically showing transfer modes (movements) of cigarettes in the cigarette testing apparatus shown in FIG. 2.

As shown in FIG. 2, the cigarette testing apparatus is featured in that a ventilation vessel 401 of the ventilation-characteristic measuring section 400 is installed horizontally so that a cigarette axially discharged from a pair of rollers 311, serving as a circumference measuring stage of the circumference measuring section 300, is transferred into the ventilation vessel 401, with a horizontal posture of the cigarette kept unchanged, and the cigarette axially discharged from the ventilation vessel 401 is transferred onto a measuring stage 522 of the length/hardness measuring section 500, with the horizontal cigarette posture kept unchanged. Thus, the cigarette testing apparatus is provided with no turnabout mechanism such as rotary holders 14, 15 for changing the direction of a cigarette, and is so configured as to cause the cigarette to roll or to be axially transferred in a horizontal position between adjacent ones of the measuring sections 200, 300, 400 and 500 for the measurement at these sections, as conceptually shown in FIG. 3.

As shown in FIG. 2, the supply mechanism 100 for horizontally supplying cigarettes one by one from the stocker 113 to the weight measuring section 200 comprises a supply drum 130 which is rotatable and formed at a peripheral face thereof with a slot 130a for receiving a cigarette. The supply drum cooperates with a guide 131 provided along the peripheral face of the drum to deliver a cigarette onto a cigarette receiving stage (weighing stage) 222a of an electric balance 222 of the weight measuring section 200. A subsidiary transfer mechanism for laterally delivering a cigarette from the cigarette receiving stage 222a comprises a rotary lever 223 which is adapted to make a rotary motion and pass through a slit (not shown) formed in the cigarette receiving stage 222a, to thereby lift the cigarette placed on the cigarette receiving stage 222a and cause the cigarette to be laterally displaced therefrom. The cigarette laterally delivered by the rotary lever 223 rolls on an inclined upper face of a guide member 224 to fall onto a pair of rollers 311 of the circumference measuring section 300 which are disposed in parallel to each other.

The circumference measuring section 300 is arranged to measure the circumference (diameter) of a cigarette placed on the rollers 311 while causing the cigarette to rotate on the rollers 311, and comprises a photosensor comprised of a transmitter 312 and a receiver 313 which are located above and below the rollers 311, respectively. The photosensor operates to send and receive a slit light between the transmitter 312 and the receiver 313 in the direction perpendicular to the axis of the cigarette and measures a slit light width blocked by the cigarette to thereby optically measure the circumference (diameter) of the cigarette.

The cigarette whose circumference has been measured in the circumference measuring section 300 receives a pressure of pressurized air blown from an air nozzle (a first transfer mechanism) 601 which is disposed at a location close to one end of each roller 311, so that the cigarette is caused to slid on the rollers, to be axially delivered. The ventilation vessel 401 of the ventilation-characteristic measuring section 400 has an opening end thereof positioned in the vicinity of the other ends of the rollers 311, so that the cigarette axially delivered from the rollers 311 is introduced into the interior of the ventilation vessel 401.

The ventilation vessel 401 is arranged to regulate, by means of, e.g., a stopper, a position at which the cigarette is held and to hermetically hold the cigarette at both end portions thereof and at a boundary portion between a shredded tobacco portion and a filter plug portion of the cigarette by means of test-piece holding members made of an elastic material and mounted to the ventilation vessel through rings. In a condition that the cigarette is held in the vessel in this manner, a measurement on ventilation characteristics of the cigarette is carried out. After the ventilation characteristic measurement is finished, the holding of the cigarette is released, and then a pressurized air is blown into the ventilation vessel 401 through the opening end of the vessel, to thereby axially eject the cigarette through another opening end of the ventilation vessel 401. The cigarette is transferred onto a measuring stage 522 of the length/hardness measuring section 500 located on the side close to another end of the ventilation vessel 401, and is positioned at a desired position on the measuring stage 522.

Under this condition, the length/hardness measuring section 500 is operated. The cigarette is positioned in place by regulating the position of one end thereof, and the position of another end of the cigarette is measured by use of a photosensor, for instance, whereby the length of the cigarette is measured. Thereafter, a predetermined load is applied to the cigarette on the measuring stage 522 from above, and a thickness of the deformed cigarette, for instance, is measured to thereby measure the hardness of the cigarette.

The cigarette having been subjected to the length and hardness measurements on the measuring stage 522 is ejected to an ejection box 800 by pushing out the cigarette laterally of the measuring stage 522 with use of a pusher, for instance.

Figure 1:
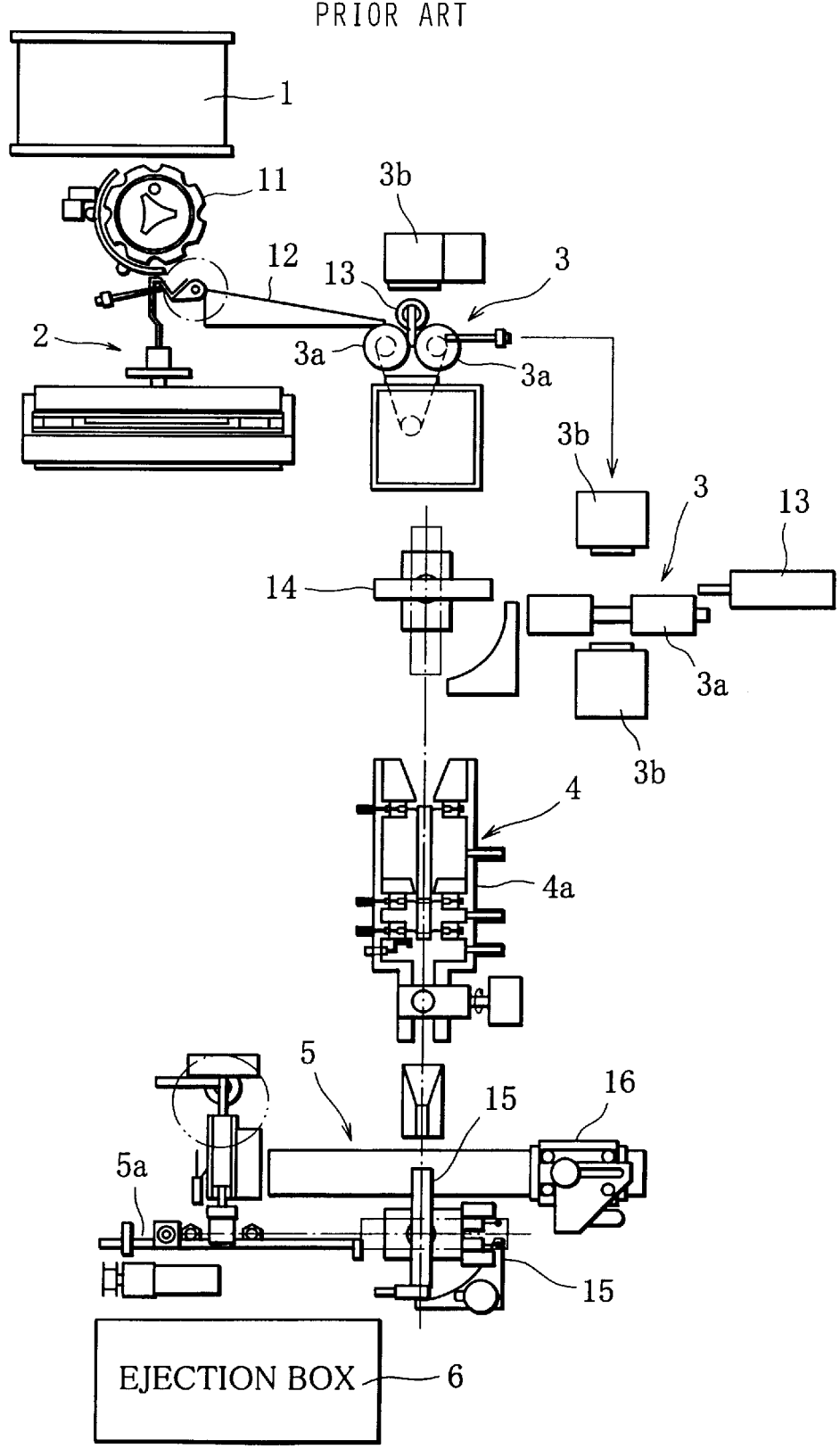
FIG. 1 is a schematic view showing a conventional cigarette testing apparatus.

With the above-mentioned cigarette testing apparatus, a cigarette is not required to be subject to a directional change during the course of cigarette transfer, so that the construction of the testing apparatus is greatly simplified. In particular, rotary holders 14, 15 shown in FIG. 1 and driving mechanisms therefor are unnecessary and hence a resultant apparatus is simplified in construction and is low in costs.

Since it is unnecessary to keep a cigarette in a vertical position during the transfer, the height dimension of the testing apparatus can be reduced. On the other hand, in a case where the ventilation vessel 401 is vertically disposed, a marginal space corresponding to the length of a single cigarette must be provided above the ventilation vessel 401 so as to permit a cigarette to be introduced into the ventilation vessel, and a marginal space corresponding to the cigarette length must be provided beneath the ventilation vessel 401 to permit a cigarette to be discharged from the ventilation vessel. The vertical size of the testing apparatus which eliminates the need of providing the marginal spaces is reduced. As a consequence, the stocker 113 for supplying cigarettes to the supply mechanism 100 can be mounted at a lower level, whereby the supply mechanism can be handled with ease.

Meanwhile, the testing apparatus in which a cigarette is transferred laterally and axially in a condition that the cigarette is kept in a horizontal position requires an increased installation area. However, the testing apparatus can be constructed without inviting a substantial increase in installation area, by using some idea, e.g., by disposing the ventilation vessel 401 in a space above which a driving section of the cigarette supplying mechanism 100 is installed.

Cigarette Supplying Apparatus

Figure 4:
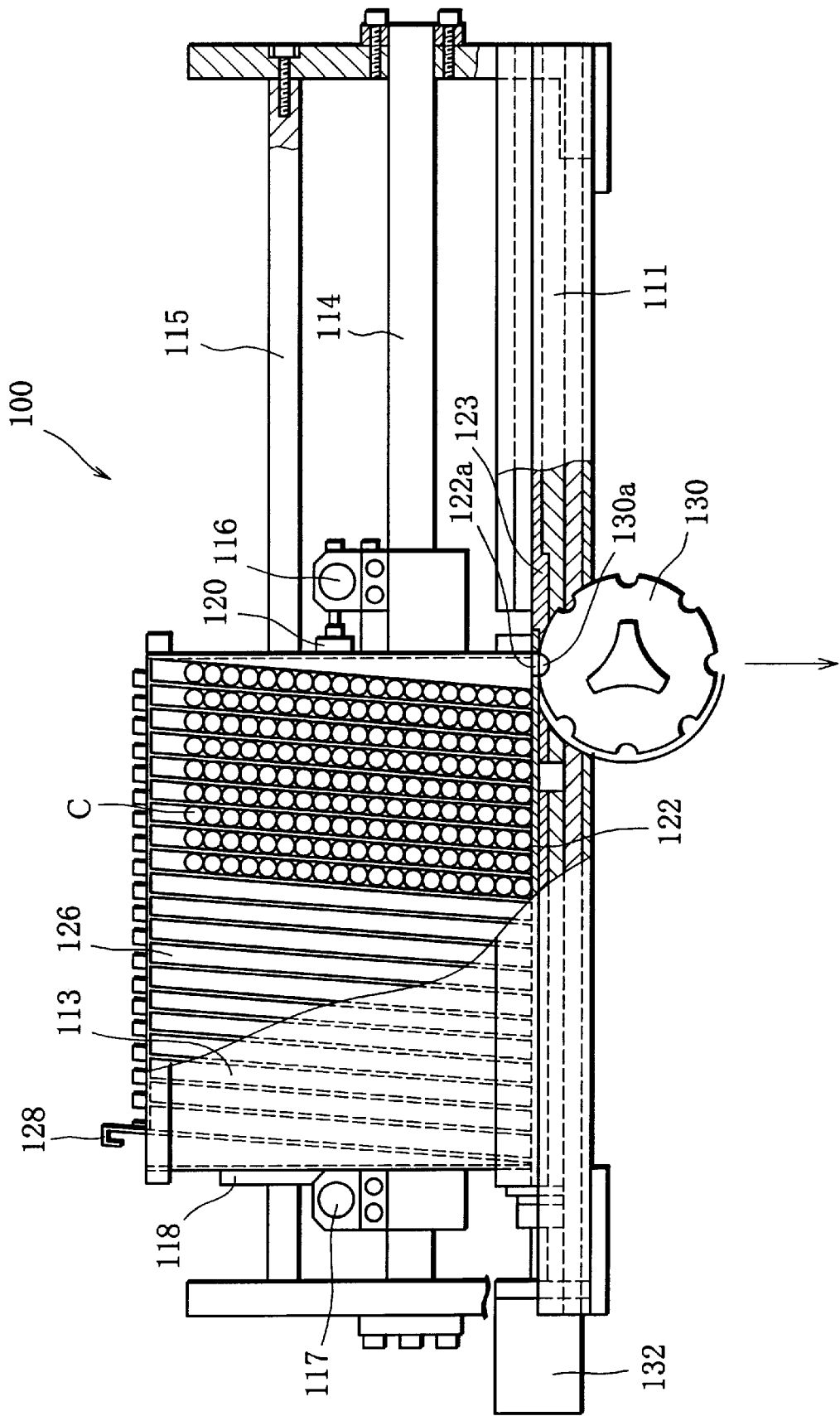
FIG. 4 is a front view, partly broken away, of a cigarette supplying apparatus.

Referring to FIG. 4, a supply box 113 is supported by positioning guides (not shown) so as to be movable to the left side and to the right side in FIG. 4, the positioning guides being fixed on the both sides of a supply stage 111. A ball-splined shaft 114 and a rack 115 are mounted on the supply stage and extend in the direction along which the positioning guides extend. A first and second arms 116, 117 are coupled to the ball-splined shaft 114. The first arm 116, which mainly serves to regulate the position of the supply box 113, is abutted against one end of the supply box 113 and operates in an interlocking manner with the drive of a motor 118 mounted on the rack 115, via a journal 119. In particular, the first arm has a function of causing the supply box 113 to move to the left side in FIG. 4 during the movement of the supply box 113 to its return position. The second arm 117 which is directly coupled to the motor 118 is engaged with another end of the supply box 113 for moving the supply box to the right side.

Reference numeral 120 denotes a cylinder for the first arm. The cylinder 120 is actuated when the supply box 113 reaches a predetermined position, to cause the first arm 116, directly coupled to the cylinder 120, to be brought in press-contact with the supply box 113, to thereby hold the supply box at this press-contact position.

A plate-like shutter 122 is supported by shutter guides, not shown, so as to be movable in the direction along which the supply box moves. The shutter guides are provided on the both sides of a lower portion of the supply box 113, and the shutter 122 is disposed to face a bottom portion of the supply box 113. The shutter 122 serves as a bottom plate of trays 126 accommodated in the supply box 113 and prevents test pieces (cigarettes) from falling from the trays. The shutter 122 is formed into a plate shape, and has a distal end thereof formed with a supply port 122a which permits only one test piece to pass therethrough and a rear end thereof having a T-shape engaging portion (not shown).

A shutter stopper 123 for regulating the position of the shutter 122 is mounted to the supply stage 111. In order to regulate the position of the shutter 122, a shutter cylinder 132 presses the shutter 122 through a pusher, so that a distal end of the shutter is brought in contact with a stepped portion of the shutter stopper 123.

Operations of the supplying apparatus 100 will be explained hereinbelow.

Trays 126, each receiving a package of twenty test pieces, are stacked together and reserved in a room which provides a prescribed environment for humidity control. Thereafter, the trays 126 are mounted to the supply box 113. To this end, the shutter 122 is inserted into the shutter guides, and the trays containing test pieces are stacked one another from below in the supply box 113. After the last tray is stacked, a spacer 128 is inserted to thereby fix the trays to the supply box 113. Next, the supply box is set up such that openings of the trays are directed downward.

Subsequently, the supply box 113 is set between the positioning guides, and the shutter cylinder 132 is actuated to press the shutter 122 against the shutter stopper 123 though a shutter pusher, to thereby position the supply port 122a of the shutter in place.

After the setting of the supply box 113 is completed, the motor 118 is actuated. As a result, the supply box 113 is pressed by the second arm 117 directly coupled to the motor 118 with rack, and slides on the fixed shutter 122 to move toward the supply drum 130. When the opening of the first tray coincides with the supply port 122a of the shutter, a photosensor (not shown) detects this, and the motor 118 is caused to stop. At the same time, the cylinder 120 for the first arm is operated, so that the supply box 113 is pressed against and held by the first arm 116. Test pieces C are discharged one by one due to their own weight to the supply drum 130 through the supply port 122a.

When the discharged number of test pieces counted by a photoelectric sensor, not shown, reaches the number of test pieces accommodated in each tray, the motor 118 is actuated again, so that the supply box 113 slides on the shutter 112 until the next tray reaches the position right above the supply port 122a. This moving distance of the supply box can be detected by a detector which is comprised of a photoelectric sensor fixed to a main body of the supplying apparatus and a pulsive reflector provided on a bottom face or a side face of the supply box, for instance.

The above-mentioned operations of positioning each tray and of discharging test pieces are repeated. When the last test piece of the last tray is discharged, the motor 118 is actuated to cause the supply box 113 to slightly move to the right side in FIG. 4, to thereby actuate a limit switch for returning the supply box. In response to the actuation of the limit switch, the motor 118 rotates reversely, so that the supply box 113 is pressed by the first arm 116 to move to the left side. When the supply box 113 returns to its initial position and actuates a limit switch for detection of the initial position, the motor 118 comes to a stop to cause the supply box 113 to stop at the initial position. Finally, the cylinder for shutter and the cylinder 120 for first arm are rendered inoperative, whereby the supply box 113 becomes detachable from the supply stage 111.

Weight Measuring Section

Figure 5:
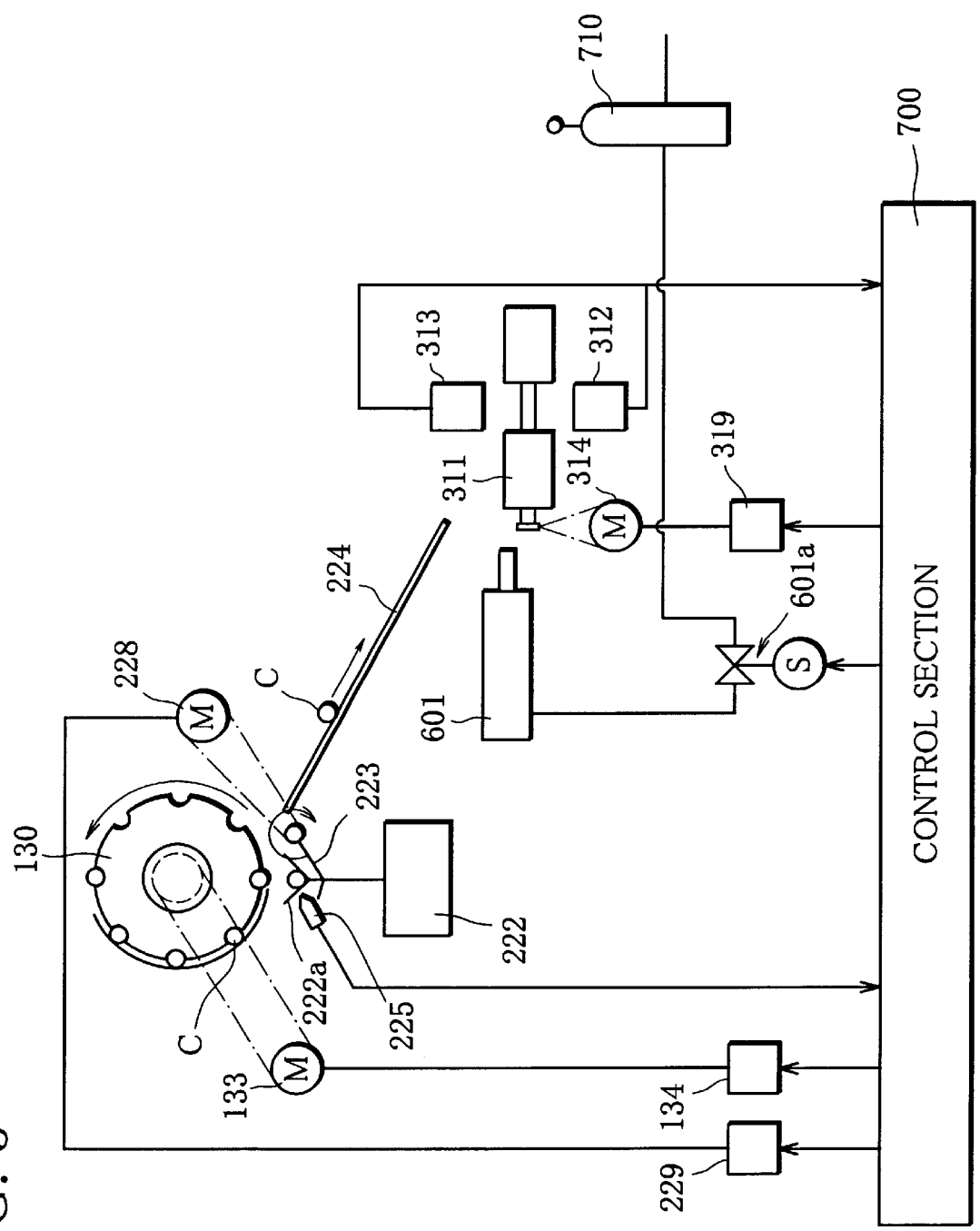
FIG. 5 is a schematic view showing a weight measuring section and a circumference measuring section.

As shown in FIGS. 2 and 5, a weight measuring section 200 comprises an electric balance 222 having a weighing stage 222a and is adapted to measure the weight of a test piece C supplied from a slot 130a of a supply drum 130 each time the supply drum 130 is rotated through predetermined angles by a supply drum motor 133 which is in turn driven by a control section 700 through a controller 134. The weight measuring section 200 further comprises an ejecting pawl 223 adapted to be rotated one turn by an ejecting pawl motor 228. The test piece, having been subjected to the weight measurement, is lifted from the weighing stage 222a by means of the ejecting pawl 223 and is ejected to a shoot 224. The ejected test piece rolls on the shoot 224 and is supplied to a circumference measuring section 300.

Circumference Measuring Section

Referring to FIGS. 2 and 5, the circumference measuring section 300 comprises a pair of test-piece revolving rollers 311 which are disposed in a horizontal position. Each roller 311 is comprised of a rotary shaft on which two short cylindrical blocks are mounted and which are spaced from each other in the axial direction of the roller. The rotary shafts of the revolving rollers 311 are coupled to a revolving roller motor 314 through a timing belt. When driven by the motor 314, the revolving rollers 311 rotate in the same direction. During a diameter measurement on a test piece, the test piece is rotated on the revolving rollers 311 on which it extends in parallel to the longitudinal direction of the rollers 311.

The circumference measuring section 300 further comprises a transmitter 312 and a receiver 313 which are disposed perpendicularly to the longitudinal axes of the revolving rollers 311 so as to face each other. The transmitter 312 is adapted to project a laser beam having a width wider than diameters of test pieces and having a predetermined quantity of light. The receiver 313 is adapted to receive a laser beam projected from the transmitter 312 and output a voltage varying in dependence on a quantity of light received.

When no test piece is placed on the revolving rollers 311, the laser beam projecting from the transmitter 312 to the receiver 313 through a gap between the revolving rollers 311 is not screened by a test piece, so that the receiver 313 generates a predetermined output voltage corresponding to a state where the laser beam is not screened. On the other hand, when a test piece is placed on the rollers 311, part of the laser beam is screened by the test piece, so that the output voltage of the receiver 313 decreases. An amount of decrease in the output voltage represents a screened width of the laser beam and hence represents the diameter of the test piece.

The circumference measuring section 300 further comprises an air nozzle 601 for ejecting a test piece from the revolving rollers 311. The air nozzle 601 is connected to a pressurized-air source 710 through a pipe in which an on-off solenoid valve 601a is disposed, and is opened and closed in dependence on the on-off position of the solenoid valve 601a. When the air nozzle 601 is open, a test piece placed on the revolving rollers 311 receives pressurized air injected from the air nozzle 601 and is transferred to be inserted into the ventilation vessel 401.

Control System for Circumference Measuring Section

When the presence of a test piece on the weighing stage 222a is detected by a detection sensor 225, the ejecting pawl motor 228 is driven by a controller 229 under the control of the control section 700, whereby the ejecting pawl 223 is rotated to cause the test piece to be transferred onto the revolving rollers 311.

Subsequently, when the test piece C is detected based on the output of the receiver 313, an ON control signal is delivered from the control section 700 to a controller 319, so that the revolving roller motor 314 is actuated to cause the test piece C on the revolving rollers 311 to rotate.

Next, the output voltage of the receiver 313 is read, and the read data is stored in a memory. Further, an index indicative of the number of times the data is read is incremented. Until the number of data-reading times reaches a prescribed value, the output voltage of the receiver 313 is read at intervals of a predetermined sampling cycle, and pieces of read data are stored in the memory in sequence. After the output voltage data detected by the receiver 313 is stored a prescribed number of times in the memory, an OFF control signal is delivered to the controller 319, so that the motor 314 comes to a stop.

Next, the air nozzle 601 is caused to open for a predetermined period of time, so that the test piece placed on the revolving rollers 311 is transferred to and received in the ventilation vessel 401. Pieces of data on the receiver output voltage are read out from the memory in sequence, and test piece diameters for evaluation of complete circle of the test piece are calculated based on the pieces of data on the receiver output voltage. The diameter calculation is repeatedly carried out with respect to all of the pieces of output voltage data. For instance, the complete circle evaluation is made based on the maximum value and the minimum value among the calculated diameters, an average value of the calculated diameters is determined as the diameter of the test piece, and the circumference of the test piece is calculated from the thus determined test piece diameter.

In this manner, the circumference of the test piece is accurately determined in non-contact process without being affected by a variation in ventilation characteristics and hardness of the test piece or cigarette.

Ventilation-Characteristic Measuring Section

Figure 6:
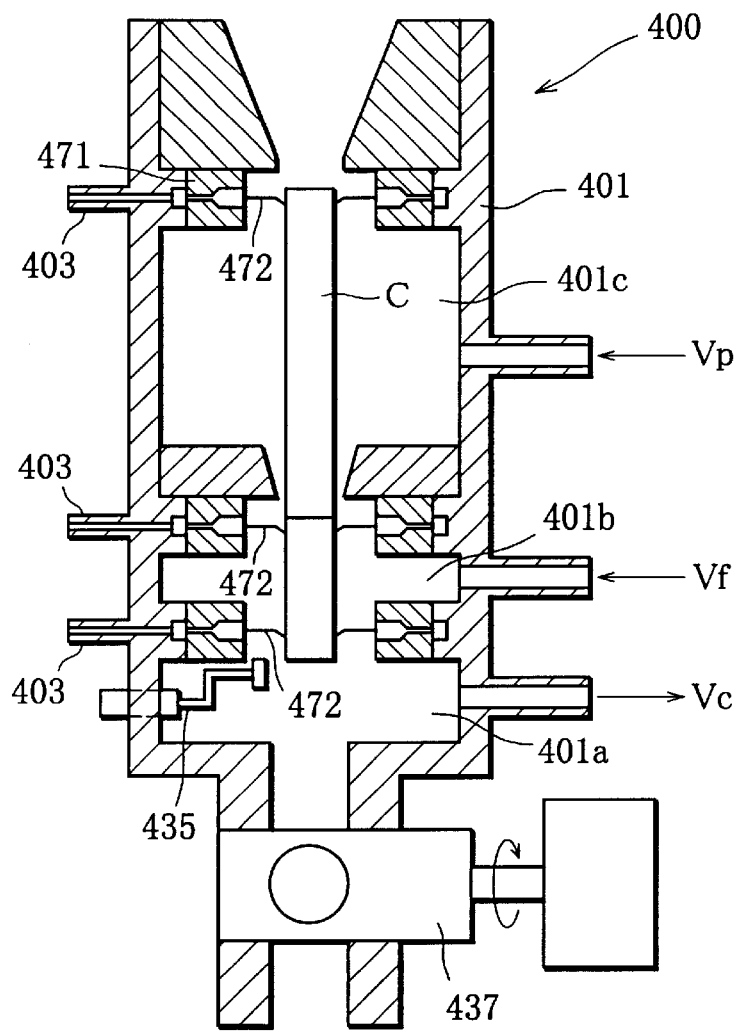
FIG. 6 is a longitudinal sectional view showing a ventilation-characteristic measuring section in a state that a test piece is held in a ventilation vessel.
Figure 7:
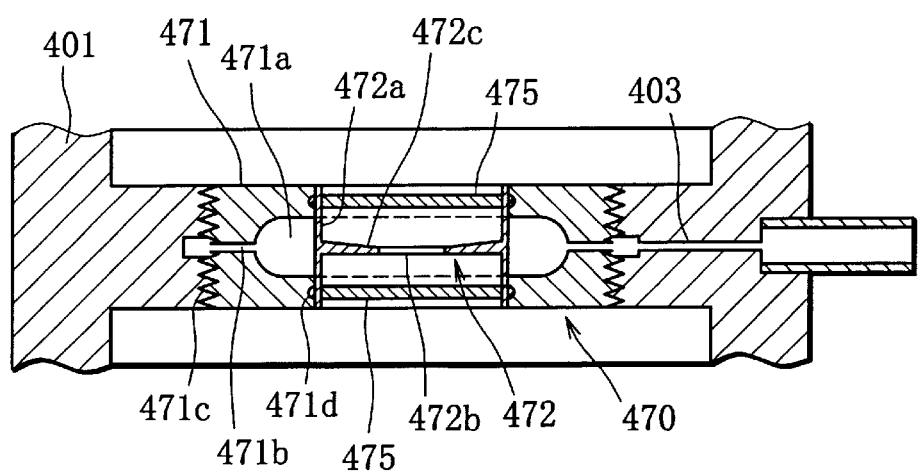
FIG. 7 is an enlarged sectional view of a test-piece supporting device shown in FIG. 6.

As shown in FIGS. 6 and 7, a ventilation-characteristic measuring section 400 comprises a ventilation vessel 401 to which test-piece supporting devices 470 for holding a test piece C are mounted. Each test-piece supporting device 470 is comprised of a test-piece holding member 472 and a ring 471 which holds the holding member.

The test-piece holding member 472, obtained by forming silicon rubber into a thin flexible cylinder, has a tubular portion 472a and a partition wall 472c projecting radially inwardly from a central part of the tubular portion 472a, the partition wall 472c being formed at its central part with a test-piece supporting hole 472b. The tubular portion 472a has its length of 12 mm, for instance, which is substantially the same as the thickness of the holding ring 471. The partition wall 472c is tapered as viewed in cross section and the thickness of the partition wall varies in a range between about 1.5 mm at its peripheral edge portion and about 0.25 mm at its central part. The test-piece supporting hole 472b has a diameter of 5 mm, for instance, which is slightly smaller than the diameter of the test piece C.

The holding ring 471 has an outer peripheral face 471c thereof formed with threads and an inner peripheral portion thereof formed with a suction chamber 471a. Two annular grooves 471d are formed in the inner peripheral face of the ring at locations above and below the suction chamber 471a. When the ring 471 is threadedly mounted to the inner wall of the ventilation vessel 401, the suction chamber 471a is communicated with the outside of the ventilation vessel through a suction hole 471b of the ring 471 and a suction passage 403 of the ventilation vessel 401. By fitting O-rings 475 in the annular grooves 471d, the test-piece holding member 472 is in close contact with and is held by an inner wall of the holding ring 471.

In the test-piece supporting device 470, when the tubular portion 472a of the test-piece holding member 472 is sucked under a negative pressure from the suction chamber 471a side, a central part, corresponding to the partition wall 472c, of the tubular portion 472a is pulled into the suction chamber 471a, so that the diameter of the test-piece supporting hole 472b expands up to about 12 mm, for instance. As a result, the test piece C is permitted to be inserted into the hole 472b from above. If the suction pressure is removed so that the suction chamber is filled with an atmospheric pressure, the tubular portion 472a of the test-piece holding member 472 is restored. As a consequence, the inner peripheral edge of the partition wall 471c is brought in press-contact with the outer peripheral face of the test piece and is slightly curved, whereby the test piece is held and airtight chambers 401a, 401b and 401c are defined. After the measurement on the test piece is completed, a suction pressure is applied again to cause the test-piece supporting hole 472 to open, so that the test piece is permitted to be discharged from the ventilation vessel.

As explained above, the test piece is supported by the thin inner peripheral edge of the partition wall. In other words, the test piece C is brought in substantially line-contact with or in face-contact at a small contact area with the supporting member 472. Thus, only the small part of the outer peripheral face of the test piece is blocked by the test-piece holding member, so that the ventilation characteristic measurement can be done with high accuracy. An adequate sealing can be attained by the partition wall.

Figure 8:
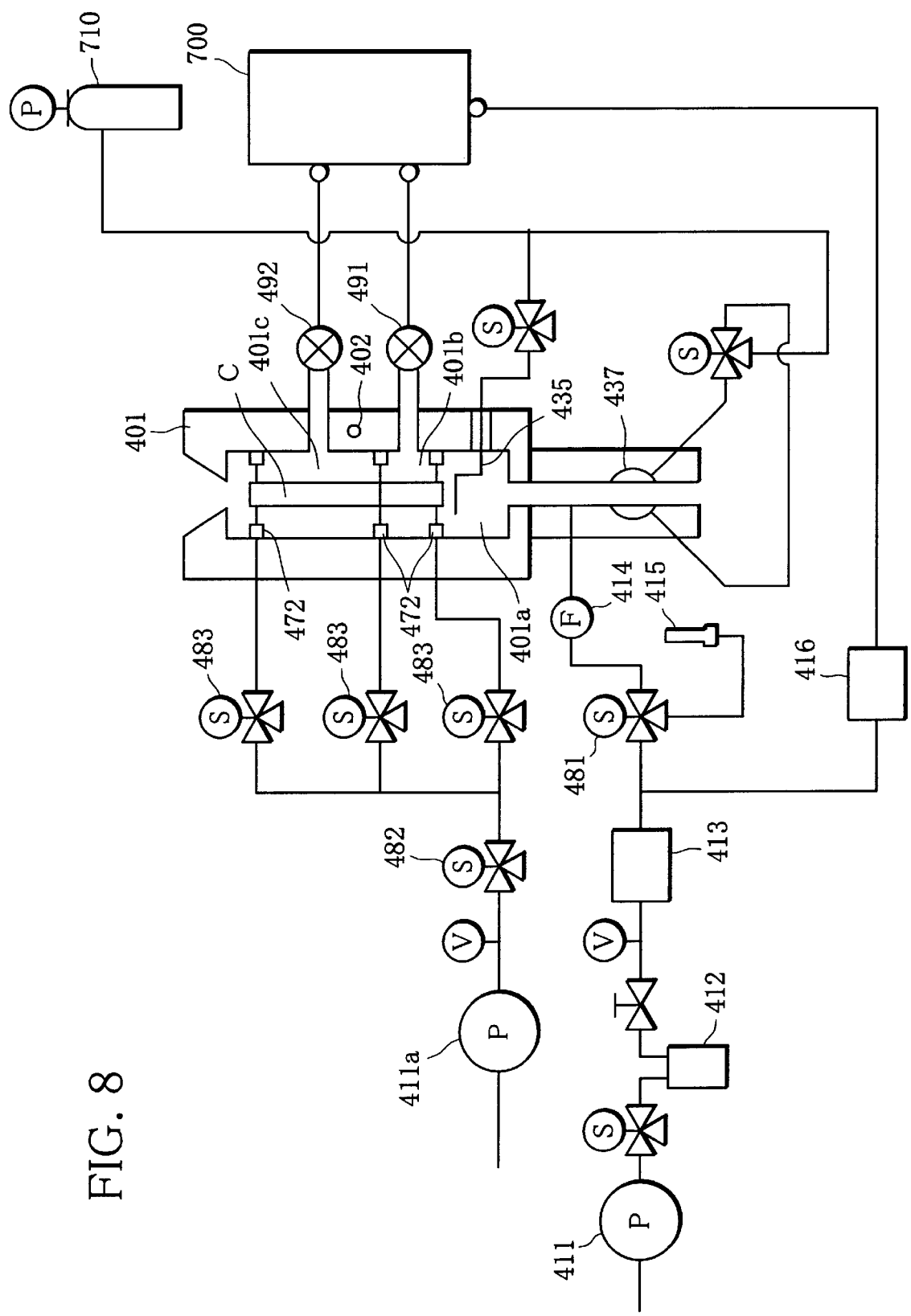
FIG. 8 is a diagram showing a control system for the ventilation-characteristic measuring section.

With reference to FIGS. 6, 7 and 8, operations of the ventilation-characteristic measuring section 400 will be explained below.

Prior to an actual measurement, the setting of a standard flow rate is made. To this end, a valve 481 for measurement/adjustment selection is changed over to an adjustment side, and a pump 411 for measurement is actuated, so that air is sucked through a standard test piece 415. In this condition, a setting index variable of a flow rate controller 413 is adjusted such that an indicated value of a ventilation-resistance measuring instrument 416 becomes equal to a known ventilation resistance value of the standard test piece 415. After this adjustment is finished, the valve 481 is fixed on a measurement side, whereby the operation of setting the standard flow rate is completed.

In response to a signal delivered from a test piece detection sensor 402 (FIG. 8) and indicating that no test piece is present in the ventilation vessel 401, the control section 700 delivers a command permitting the delivery of a test piece. In response to this command, a rotary valve 437 and a test piece stopper 435 are set in their closed positions, and test piece support control valves 482, 483 of a vacuum system 411a are opened. Further, the tubular portion 472a of the test piece holding member 472 is sucked under negative pressure, so that the diameter of the test-piece supporting hole 472b increases.

Thus, the test piece having been subjected to the circumference measurement is delivered from the circumference measuring section 300 into the ventilation vessel 401 and is held by the test piece stopper 435.

The test piece C held in the ventilation vessel 401 is detected by the test-piece detecting sensor 402. In response to a detection signal supplied from the sensor, the control section 700 delivers an OFF command to a test piece support control valve 483, whereby the valve 483 is closed. As a result, the tubular portion 472a (suction chamber 471a) of each test piece holding member 472 is filled with an atmospheric pressure, and the diameter of each test piece supporting hole 472b decreases, so that the test piece C is held by the supporting members and the three airtight chambers 401a, 401b and 401c of the ventilation vessel 401 are defined. Further, the test piece stopper 435 is brought in its open state, and a ventilation characteristic measurement is started.

The difference between an atmospheric pressure and a negative pressure in the first airtight chamber 401a is measured by the ventilation resistance measuring instrument 416, an amount of air entering into the test piece C through that test piece portion (filter portion) which is disposed in the second airtight chamber 401b is measured by a flow meter 491 provided in a pipe communicating with the second airtight chamber 401b, and an amount of air entering into the test piece C through another test piece portion (shredded tobacco portion) disposed in the third airtight chamber 401c is measured by a flow meter 492 provided in a pipe communicating with the third airtight chamber 401c. Subsequently, these measured values are received by the control section 700 in which the ventilation resistance of the whole of the test piece and entering-air ratios for the respective test piece portions are calculated.

After the measurement is finished, in accordance with commands delivered from the control section 700, the rotary valve 437 is opened, and the valve 483 for test piece holding control is opened, so that the test piece holding members are sucked and the diameters of the test piece supporting holes 472b are enlarged. As a result, the test piece C is released and is permitted to be discharged from the ventilation vessel 401.

Second Transfer Section

Figure 9:
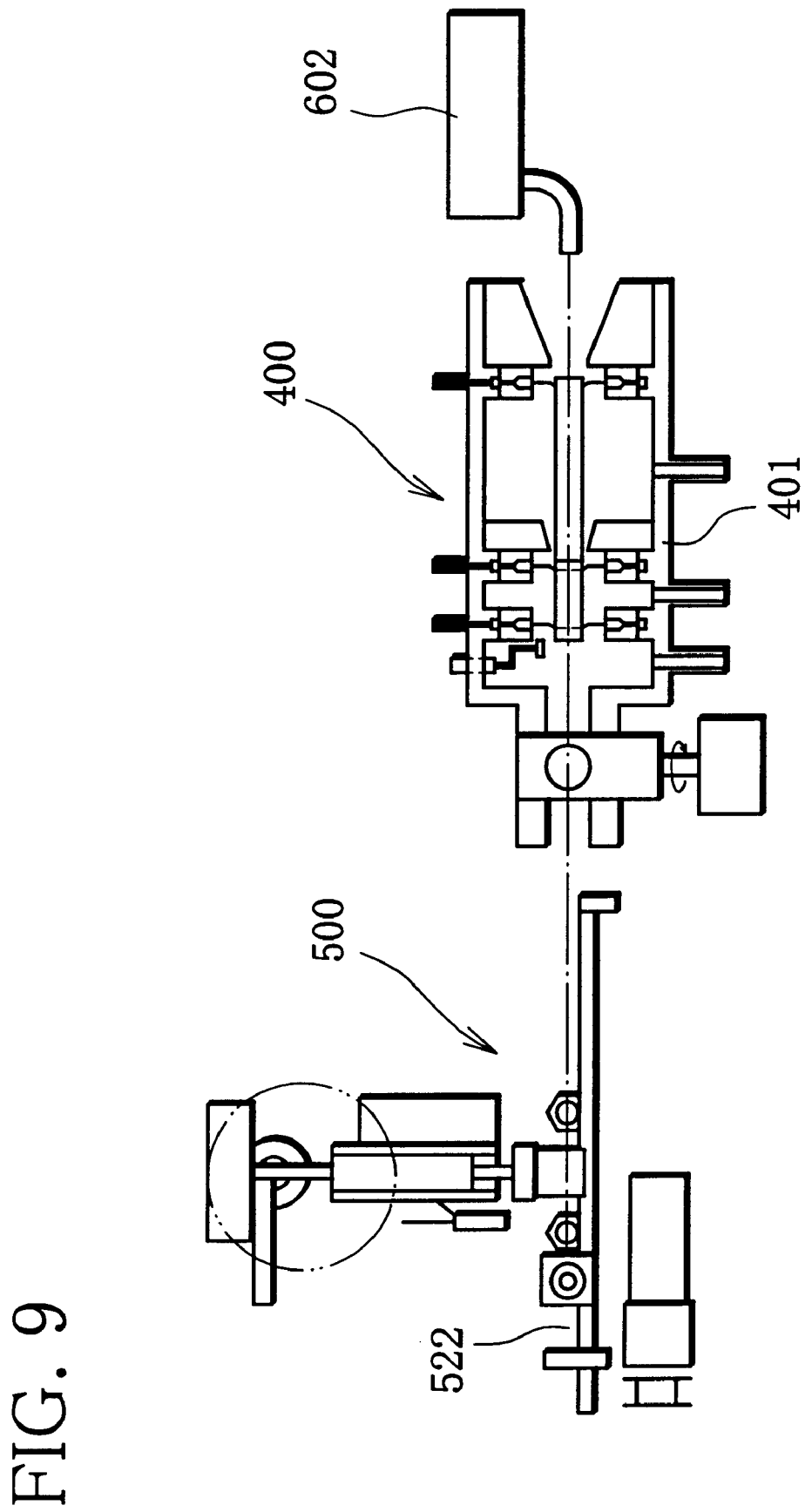
FIG. 9 is a schematic side view showing an air nozzle for discharging a test piece in the ventilation vessel toward revolving rollers of a length/hardness measuring section.

As shown in FIG. 9, the cigarette testing apparatus comprises an air nozzle (second transfer section) 602 for transferring a cigarette from the ventilation vessel 401 of the ventilation-characteristic measuring section 400 to a length/hardness measuring section 500. The air nozzle 602 is mounted to, e.g., a pneumatic air-nozzle driving mechanism (not shown) and is connected with a pressurized-air source through a solenoid valve. Ordinarily, the air nozzle 602 recedes upward and laterally from one of the revolving rollers 311 of the circumference measuring section 300 in the vicinity of the opening of the ventilation vessel 401 on the cigarette insertion side. Before the test piece is discharged from the ventilation vessel 401, the air nozzle 602 is positioned by the air nozzle driving mechanism at a test piece discharging position where a nozzle portion of the air nozzle is alignment with the axis of the ventilation vessel 401.

After the ventilation measurement in the ventilation-characteristic measuring section 400 is finished, the stopper 435 is moved to the receding position in the ventilation vessel and the rotary valve 437 is opened under the control of the control section 700. In this condition, the solenoid valve controlled by the control section 700 is opened, to thereby inject a pressurized air onto the end face of the test piece in the ventilation vessel, so that the test piece is ejected from the ventilation vessel.

Length/hardness Measuring Section

Figure 10:
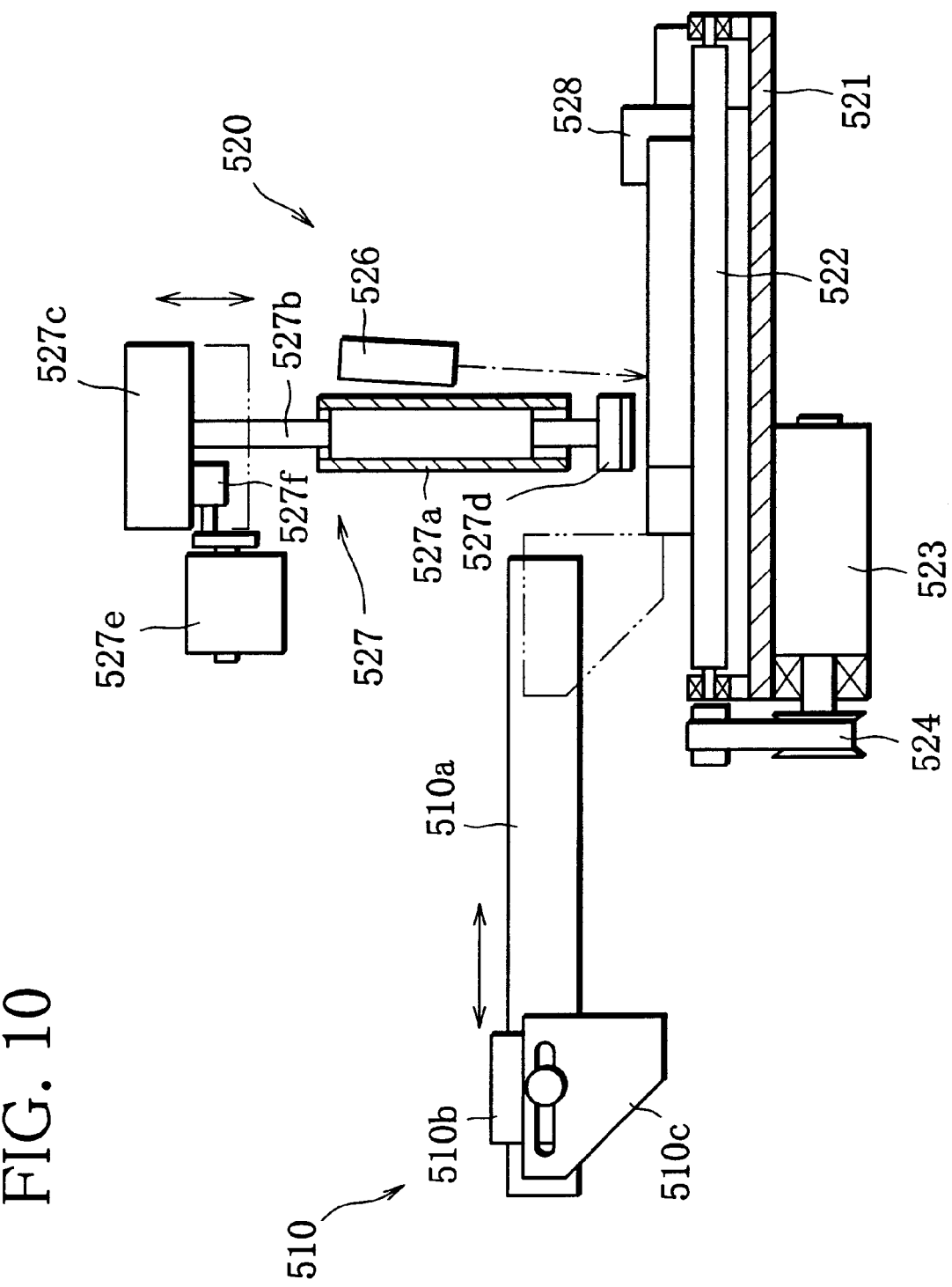
FIG. 10 is a schematic side view of the length/hardness measuring section.
Figure 11:
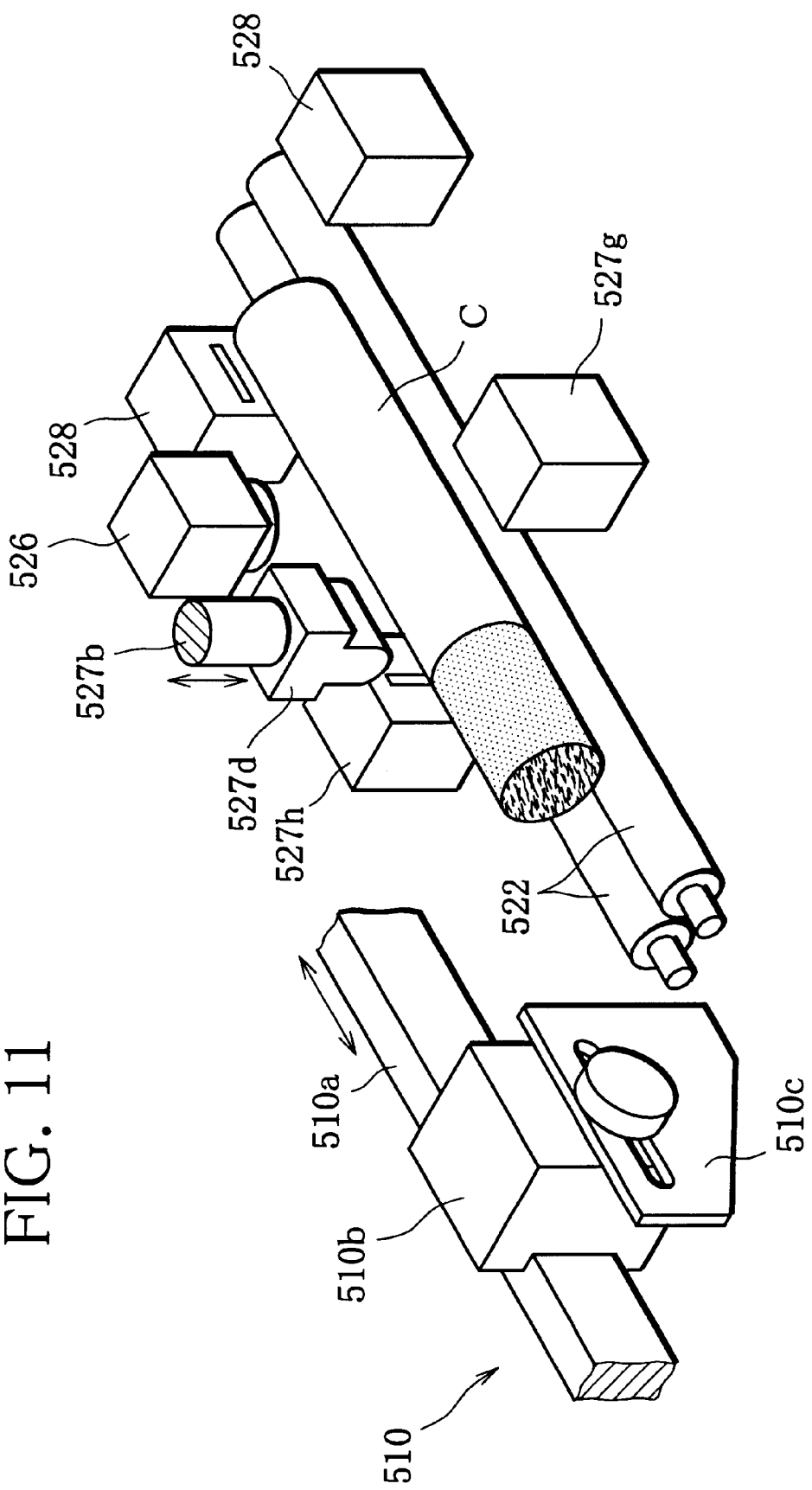
FIG. 11 is a schematic perspective view of the length/hardness measuring section shown in FIG. 10.

As shown in FIGS. 10 and 11, a length/hardness measuring section 500 comprises a cigarette positioning mechanism 510 and a measuring unit 520.

The positioning mechanism 510 is comprised of a stationary member (regulating member) 510c for stopping a cigarette C discharged from the ventilation vessel 401, a movable carrier 510b on which the stationary member 510c is mounted and which is movable toward and away from the measuring unit 520, and a guide rail 510a for guiding the movable carrier 510b.

Ordinarily, the movable carrier 510b and the stationary member 510c of the positioning mechanism 510 are located at their preceding positions laterally (to the left side in the drawing) away from the measuring unit 520 so as not to disturb an operation of circumferentially positioning a lap portion of a cigarette at the time of hardness measurement and an operation of ejecting a cigarette after length/hardness measurement. When a cigarette C having been subjected to the ventilation characteristic measurement is transferred by the application of pressurized air injected from the air nozzle 602, the movable carrier 510*b* and the stationary member 510*c* are already moved to their measurement positions, whereby the cigarette can be positioned at a measurement position by the stationary member 510*c*. The mounting position of the stationary member 510*c* onto the movable carrier 510*b* is adjustable. By adjusting the mounting position, the position of the cigarette C regulated by the stationary member 510*c* can be changed.

The measuring unit 520 comprises two revolving rollers 522 which are disposed in parallel to a framework 521 and which constitute a measuring stage. These rollers 522 are disposed in axially alignment with the ventilation vessel 401, with their one end portions located close to the ventilation vessel 401. The rollers 522 permit a cigarette C, transferred from the ventilation vessel 401 by the application of pressurized air, to slide thereon while keeping the direction of the cigarette unchanged, to thereby guide the cigarette to a length/hardness measurement position. The rollers 522 are rotatively driven, where required, e.g., through a belt mechanism 524 by a motor 523 mounted on a bottom face of the framework 521.

In relation to the cigarette length measurement, a photosensor 528 is disposed laterally of the rollers 522 such that an optical path of the photosensor extends to cross another end portion of the cigarette C placed on the rollers 522. The photosensor 522 is comprised of a transmitter LD and a receiver PD, disposed on both sides of the rollers 522, for transmitting and receiving therebetween a slit light beam having a predetermined beam width (see, FIGS. 11, 14 and 15). The transmitter LD is comprised of a semiconductor laser transmitter, and the receiver PD is comprised of a line photosensor, for instance. The position of another end (distal end) of a cigarette C is measured based on a width for which the slit light is blocked by the cigarette C, i.e., based on a slit light width detected by the receiver PD among the predetermined slit light width. Subsequently, the length of the cigarette C is measured from the measured position of the distal end of the cigarette C and the position of one end of the cigarette C regulated by the stationary member 510*c*.

Figure 13:
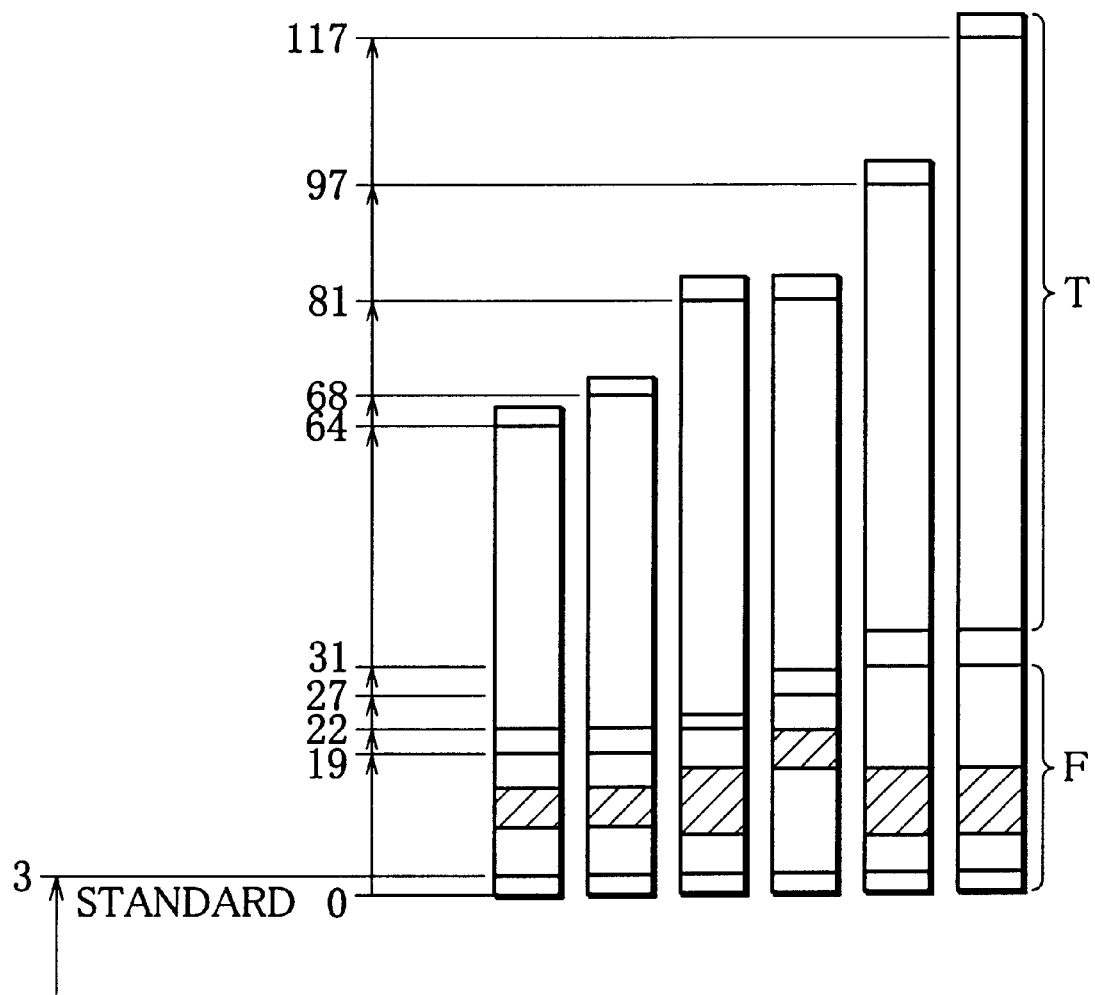
FIG. 13 is a view showing by way of example lengths of cigarettes which vary depending on cigarette brands.

Depending on cigarette brands, cigarettes C are different in length and thickness and have filter portions F and shredded tobacco portions T which are different in length, as shown by way of example in FIG. 13. In order to measure lengths of cigarettes C of various brands with use of the same photosensor, the photosensor is required to produce a slit light beam which is broad enough to provide a sensing region wider than the difference between the maximum length and the minimum length among standard cigarette lengths which vary depending on cigarette brands. Such a photosensor is high in costs and is complicated in construction.

In the testing apparatus described herein, the stationary member 510*c* for regulating the position of one end of a cigarette C, transferred by pressurized air injected from the air nozzle 602 and placed on the rollers 522, is mounted to the movable carrier 514 which is movable along the guide rail 510*a*, in such a manner that the mounting position of the stationary member is adjustable in the moving direction of the movable carrier, as mentioned above. The regulated position of one end of the cigarette C on the rollers 522 is varied by the positional adjustment in accordance with the length of a cigarette C to be measured. More specifically, in the case where the measurement is made on a cigarette C which has a longer length, the stationary member 510*c* is positioned on the rear end side of the movable carrier 510*b*. In the case of the measurement on a cigarette C having a shorter length, the stationary member 510*c* is positioned on the front end side of the movable carrier 510*b*.

Figure 14:
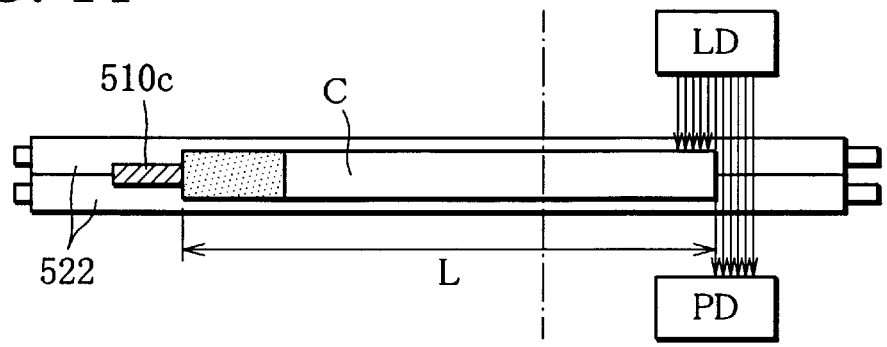
FIG. 14 is a schematic plan view showing positions of cigarettes on the rollers of the length/hardness measuring section at the time of a length measurement.
Figure 15:
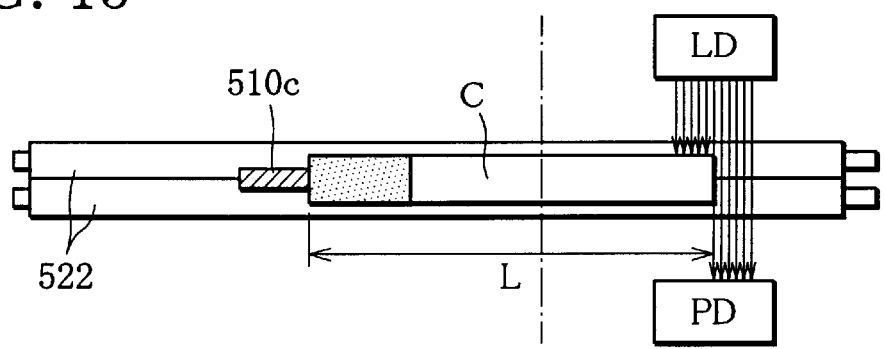
FIG. 15 is a schematic plan view showing different positions of cigarettes at the time of a length measurement.

As a result of the adjustment of the position of the stationary member 510*c* relative to the movable carrier 510*b*, the regulated position of one end of a cigarette C on the rollers 522 observed when the movable carrier 510*c* is moved up to a predetermined position along the guide rail 510*a* varies so as to conform to the cigarette length, as shown in FIGS. 14 and 15. As a consequence, irrespective of a difference in standard lengths of cigarettes C varying depending on cigarette brands, another end portion of every cigarette C is positioned within the sensing region of the slit light generated by the photosensor 528. Thus, the length of every cigarette C can be measured based on the detected position of the distal end of the cigarette C, irrespective of a standard cigarette length varying depending on cigarette brand. Whereupon, an excess or deficiency in length relative to the standard length is determined.

More specifically, for the length measurement on test pieces, a reference point is set in advance in such a manner that part of the laser light beam is blocked by a distal end portion of a standard gauge having a known length. In the case of a length measurement on test pieces having a standard length of 85.0 mm, for instance, a standard gauge having a length L0 (=85.0 mm) is placed on the rollers 522, and the mounting position of the stationary member 510*c* onto the movable carrier 510*b* is adjusted so that the distal end of the standard gauge is located at the center of the laser light beam. If the transmitter LD and the receiver PD of the photosensor 528 are configured by laser sensors of a type where an output of the receiver varies from 1 volt at the time when the laser beam is fully blocked to 5 volts at the time when it is not blocked at all, the mounting position is adjusted in such a manner that the output voltage of the receiver becomes equal to 3 volts.

The deviation of the length of a test piece from that of the standard gauge, or the length L of the test piece, is measured based on the difference between the outputs of the receiver observed when part of the laser light beam is blocked by the standard gauge and when it is blocked by the test piece. That is, the length of the test piece is determined in accordance with the formula of L=L0+(E−3.00), where E represents the output voltage of the receiver produced when the length measurement on the test piece is made.

In relation to a cigarette hardness measurement, a pressurizing mechanism 527 is disposed above the rollers 522. The pressurizing mechanism 527 comprises a rod 527*b* coupled to a cylinder 527*a* so as to be vertically movable in unison therewith, a loading plate 527*c* for applying a predetermined downward load to the rod 527*b*, and a pressurizing member 527*d*, mounted to a lower end of the rod 527*b*, for applying the downward load to a peripheral face of a cigarette C placed on the rollers 522, to thereby press the cigarette peripheral face from above. The vertical motion of the rod 527*b* (or the pressurizing member 527*d*) is controlled by an eccentric roller 527*f* which is eccentrically mounted to a rotary shaft of a motor 527*e* and which is adapted to abut against a lower face of the loading plate 527*c* and lift the loading plate 527*c*.

In relation to the hardness measurement, the measuring unit 520 comprises a transmitter 527*g*, disposed on one lateral side of the rollers 522, for projecting a laser light beam, and a receiver 527h, disposed on the other side of the rollers so as to face the transmitter 527g, for receiving a laser beam from the transmitter and for generating an output voltage which varies depending on an amount of light received. When a cigarette C is placed on the rollers 522, part of the laser beam is blocked by the cigarette. If the loading member 527d is brought in contact with the cigarette, the laser beam is fully blocked by the loading member and the cigarette. At this time, the receiver 527h generates a prescribed voltage.

Figure 12:
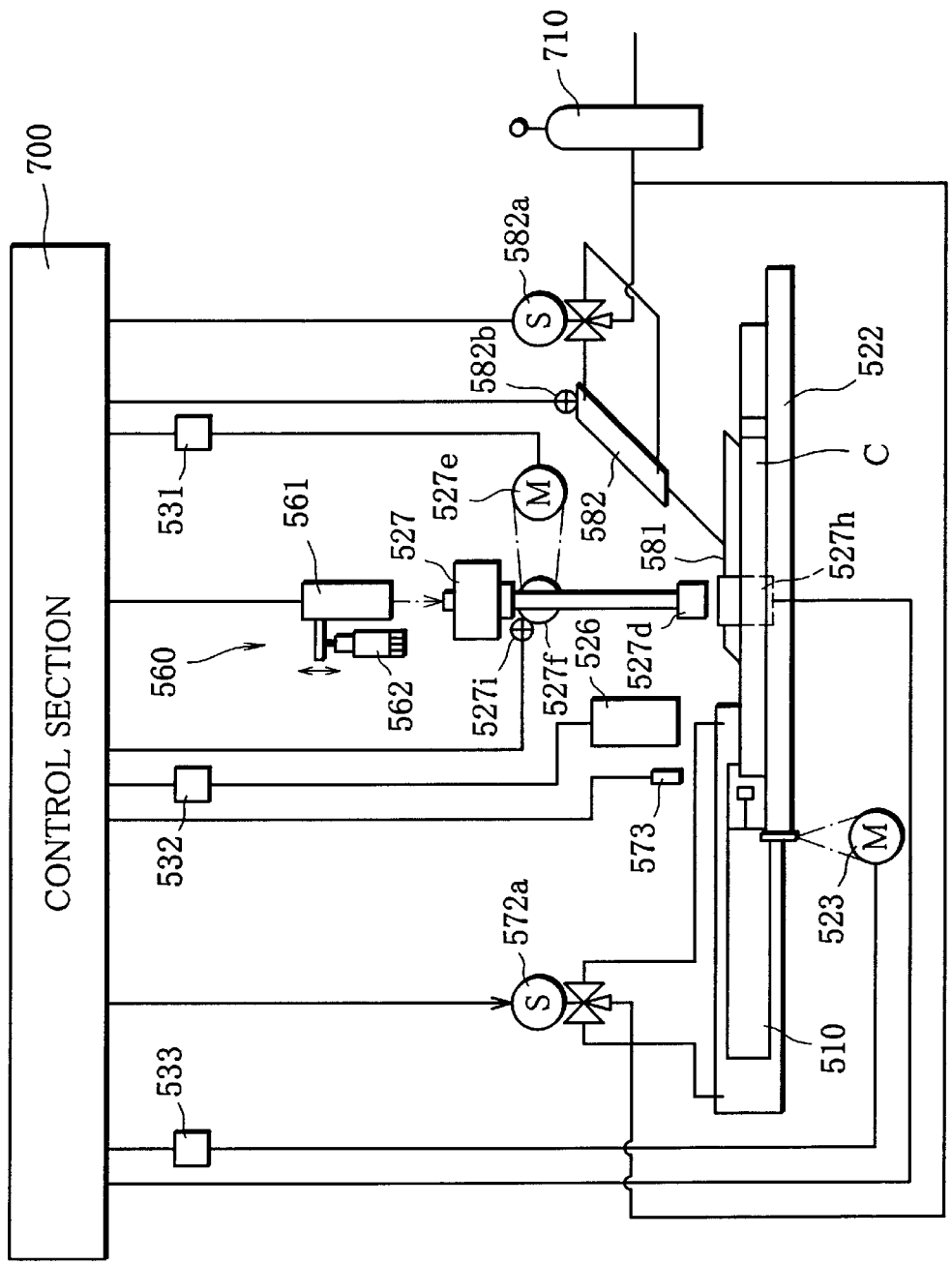
FIG. 12 is a diagram showing a control system for the length/hardness measuring section.

The measuring unit 520 further comprises a displacement detecting section 560 for detecting the position of the pressurizing member 527d (FIG. 12). The displacement detecting section 560 is comprised of a laser displacement gauge 561 for projecting a laser beam toward an upper end face of the loading plate 527c of the pressurizing mechanism and for receiving a reflected light beam from the loading plate, to generate a voltage indicative of a distance, determined by triangulation, up to the upper end face of the loading plate, and an adjuster 562 for adjusting the position of the displacement gauge 561. As the displacement gauge 561, an MQ laser analog sensor of LA40 type, manufactured by Matsushita Electric Works, Ltd., or the like may be employed.

Prior to the hardness measurement with use of the above-mentioned measuring unit 520, a criterion adjustment is carried out. In the criterion adjustment, a standard gauge (not shown) which is rigid and has a known diameter is placed on the rollers 522, and the position of the laser displacement gauge 561 is adjusted by the adjuster 562 in such a manner that the output voltage of the displacement gauge 561 becomes equal to a prescribed value, e.g., 0 volt, in a condition that the pressurizing member 527d in a free state is brought in contact with the standard gauge.

Figure 16:
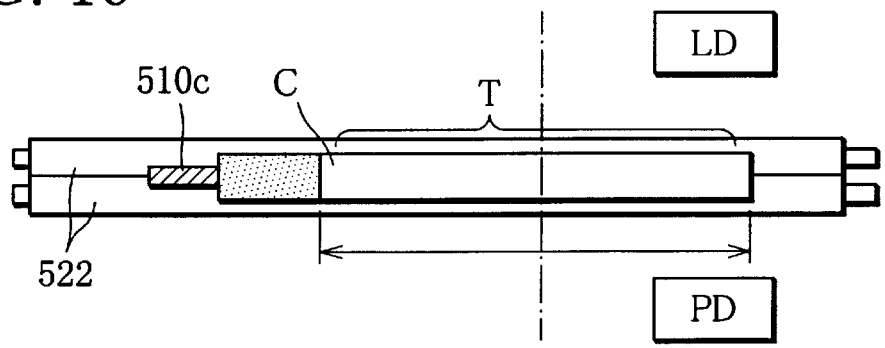
FIG. 16 is a schematic plan view showing positions of cigarettes on the rollers at the time of a hardness measurement.
Figure 17:
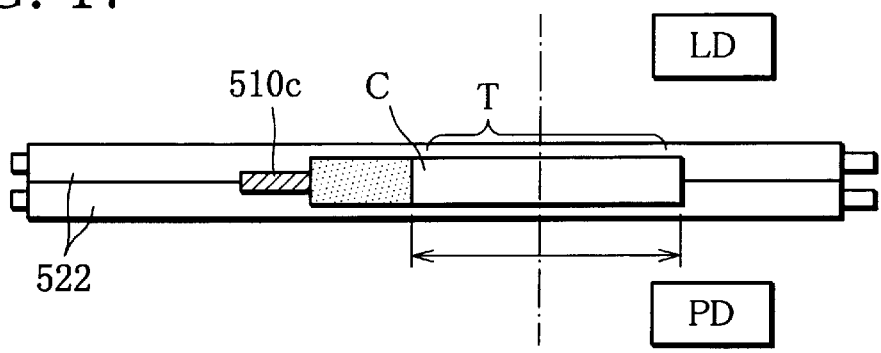
FIG. 17 is a schematic plan view showing different positions of cigarettes at the time of a hardness measurement.

Upon an actual hardness measurement, the stationary member 510c is moved forward from the length measurement position by a predetermined distance varying depending on the brand of a cigarette C, and pressurized air is injected from the air nozzle 602 so that the position of one end of the cigarette C is reliably regulated by the stationary member 510c, whereby the position of the cigarette C is re-adjusted. As a consequence, an axial center part of shredded tobacco portion T of the cigarette C can be easily positioned at a pressurizing position (shown by one-dotted chain line in FIGS. 16 and 17) to which the pressurizing member 527d of the pressurizing mechanism 527 is positioned. Thus, the hardness measurement can be carried out by pressurizing substantially the center part of the shredded tobacco portion T of the cigarette T by means of the pressurizing member 527d.

In the meantime, a directionality is produced in tobacco shreds in a cigarette during the processes, constituting part of cigarette manufacturing processes, of wrapping tobacco shreds by a paper and of pasting edge portions of the wrapping paper. As a result of this directionality of shredded tobacco, a result of a hardness measurement may vary depending on whether a pressure for the hardness measurement is applied to a lap portion of the wrapping paper or a circumferential portion other than the lap portion, causing a measurement error. To obviate this, in the present embodiment, a cigarette C is rotated on the rollers 522 by rotatively driving the rollers 522 by the motor 523, and the cigarette rotation is caused to stop when a lap portion (a pasted portion of a wrapping paper in which shredded tobacco is wrapped) is detected by the photosensor 526, so that a pressure for hardness measurement is always applied to the same cigarette portion. The lap portion is detected by the photosensor 526 in the form of a change in an amount of reflected light. The photosensor 526 projects light onto a peripheral face of a cigarette C placed on the rollers 522 and detects reflected light therefrom.

As a photosensor (mark sensor) 526, a supper analog sensor RS-120HF-5G-SAS manufactured by Sankusu Corporation in Japan, for instance, may be used.

In the hardness measurement, both an output voltage of the displacement gauge 561 generated when the pressurizing member 527h is in contact with a cigarette and an output voltage of the displacement gauge generated when a predetermined load is applied to the cigarette by the pressurizing mechanism 527 are detected. Subsequently, a cigarette diameter D1 observed when the pressurizing member is in contact with the cigarette is determined on the basis of the difference between output voltages respectively generated when the pressurizing member is in contact with the cigarette and when it is in contact with the standard gauge. Further, a cigarette diameter D2 at the time of applying a load to the cigarette is determined on the basis of the difference between output voltages respectively generated when a load is applied to the cigarette and when the pressurizing member is in contact with the standard gauge. Then, an amount of deformation $\epsilon$ (%) of the cigarette caused by the application of load and indicative of the cigarette hardness is determined in accordance with the formula of $\epsilon=100(D1-D2)/D1$.

Control System for Length/hardness Measuring Section

As shown in FIG. 12, the positioning mechanism 510, the motor 523 for the revolving rollers, and the motor 527e of the pressurizing mechanism 527 of the measuring unit 520 are operated under the control of the control section 700.

Connected to the control section 700 are a controller 531 for controlling the drive of the motor 527e of the pressurizing mechanism 527, a controller 532 for detecting an output voltage of the mark sensor 526 and for supplying the control section 700 with a lap portion detecting signal when it detects a change in output voltage indicative of a lap portion of a test piece, and a controller 533 for controlling the drive of the motor 523 for the revolving rollers.

Further connected to the control section 700 are a solenoid valve 572a, disposed in a pipe which connects the positioning mechanism 510 with a pressurized-air source 710, for changing the direction of pressurized air supply to the positioning mechanism 510, and a solenoid valve 582a, disposed in a pipe which connects an ejection pusher cylinder 582 with the pressurized-air source 710, for changing the direction of pressurized air supply to the ejection pusher cylinder 582.

The positioning mechanism 510 is caused to have an ON or OFF state in response to the switching action of the solenoid valve 572a. The positioning mechanism causes, in an ON state, the stationary member 510c to move to the right side in FIG. 10, whereas it causes the stationary member 510c to move to the opposite side in an OFF state. The ejecting pusher cylinder 582 is caused to have an ON or OFF state in response to the switching action of the solenoid valve 582a. This cylinder operates, in an ON state, to cause the ejection pusher 581 to move in the direction close to the revolving rollers 522, and operates, in an OFF state, to cause the pusher 581 to move in the direction away from the rollers 522. An ejecting pusher switch 582b is turned on when the ejecting pusher 581 is retreated into the ejecting pusher cylinder 582, whereas it is turned off as the test piece is ejected by the ejecting pusher 581.

In FIG. 12, reference numeral 527i denotes an eccentric roller switch which is turned on when the rod 527b of the pressurizing mechanism 527 is at its upper receding position.

In relation to the length/hardness measurement, the control section 700 drives the positioning mechanism 510 until a positioning sensor 573 is turned on in a condition that the ejecting pusher switch 582b and the eccentric roller switch 527i are in their ON positions, to thereby cause the stationary member 510c to move to its length measurement position. Whereupon, the length measurement on the test piece is carried out.

Upon completion of the length measurement, the stationary member 510c is caused to move forward from the length measurement position by a predetermined distance, to thereby securely position the same at a hardness measurement position. Under this state, the air nozzle 602 is driven so as to cause the test piece to abut against the stationary member 510c, to thereby position the test piece at the hardness measurement position. Subsequently, the motor 523 for the revolving rollers is driven, so that the test piece rotates on the revolving rollers 522. When a lap portion detecting signal is delivered from a mark sensor controller 532 in this condition, the motor 523 is caused to stop.

Next, the control section 700 drives the motor 527e of the pressurizing mechanism 527 through the controller 531, and monitors the output voltage of the receiver 527h for the hardness measurement. When detecting that the pressurizing member 527d is brought in contact with the test piece, the control section causes the motor 527e to stop and reads out the output voltage (position data) of the laser displacement gauge 561, the read output voltage being stored in a memory. Subsequently, the motor 527e of the pressurizing mechanism 527 is driven. After a predetermined load is applied to the test piece for a predetermined period of time, the control section reads out the output voltage of the laser displacement gauge 561 and stores the same in the memory.

When the eccentric roller switch 527i is turned on as the motor 527e is driven, the control section causes the motor 527e to stop, and sets the ejecting pusher cylinder 582 in an ON state for a predetermined time period, so that the test piece on the revolving rollers 522 is ejected toward the ejection box 800 (FIG. 2).

When the test piece ejection is finished, the control section reads out pieces of position data from the memory, and calculates an amount of deformation of the test piece, indicative of its hardness. Whereupon, the hardness measurement is finished.

According to the cigarette testing apparatus constructed as explained above, the length measurement is carried out in a state where a cigarette is held horizontally on the rollers 522 and is aligned axially therewith Thus, the cigarette C is prevented from being inclined in the measuring direction, and the measurement can be made stably and accurately, irrespective of the thickness (diameter) of the test piece. That is, the length measurement can be made with accuracy in a condition that the posture of the cigarette C is maintained constant. Since the rollers 522 on which the cigarette is placed are used for both the hardness measuring stage and the length measuring stage, the overall arrangement of the testing apparatus can be simplified.

Furthermore, since the position of the stationary member 510c for regulating the position of one end of a cigarette C on the rollers 522 is changed in accordance with the standard length varying depending on cigarette brands, the distal end portion of the cigarette C can be positioned in a specific sensing region irrespective of a variation in standard length. Thus, it is unnecessary to broaden the sensing region of the photosensor 528, that is, it is enough for the photosensor to provide the slit light having a width corresponding to a variation in cigarette lengths. In other words, a sufficient measurement accuracy can be advantageously attained, even with use of a photosensor, having a slit light width of about 10 mm, which is of a type for general purpose use and is hence low-priced.

The present invention is not limited to the foregoing embodiment.

For instance, although the cigarette testing apparatus has been explained in the embodiment, in which weight and circumference measurements are performed on the side upstream of the ventilation characteristic, and length and hardness measurements are performed on the side downstream thereof, the measurement items on the sides upstream and downstream of the ventilation-characteristic measuring section are not limited to weight, circumference, length and hardness. Furthermore, the present invention is applicable to a testing apparatus for performing a quality inspection on rod-shaped test pieces other than cigarettes.

Further, various apparatus sections of the cigarette testing apparatus according to the above-described embodiment may be modified variously.

Although the rollers 522 are used for both the length measuring stage and the hardness measuring stage in the embodiment, these measuring stages may be configured separately from each other. In that case, the measuring stage for the length measuring section may be designed variously so long as it has a guide portion in which a cigarette C is held horizontally and the direction of the cigarette is maintained constant. Instead of making the mounting position of the stationary member 510c movable relative to the movable carrier 510b, an amount of movement of the movable carrier 510b may be controlled for adjusting the cigarette position on the rollers 522.

The present invention can be embodied in various manners within the scope of the invention.

The length/hardness measuring section described in the embodiment is applicable to a cigarette testing apparatus having a ventilation vessel which is disposed in a vertical position. In that case, a guide for guiding a cigarette is provided below the ventilation vessel and a rotary holder is provided below the guide, so that a cigarette discharged from the ventilation vessel is transferred through the guide to the rotary holder in which the posture or direction of the cigarette is changed from a vertical position to a horizontal position, and then the cigarette is transferred to the length/hardness measuring section by means of a pusher mechanism, for instance.

What is claimed is:

1. A rod-shaped test piece testing apparatus comprising:
a test piece supplying section for horizontally supplying test pieces one by one, said test piece supplying section having a supply box for receiving the test pieces;
a first measuring section, having a first measuring stage on which a test piece supplied from said test piece supplying section is held horizontally, for making a measurement on a first test item for the test piece, with the test piece held on said first measuring stage, said first measuring section includes
a weight measuring section having a weighing stage on which the test piece supplied from said test-piece supplying section is held horizontally for measuring a weight of the test piece on the weighing stage,
a circumference measuring section having a circumference measuring stage on which the test piece is held horizontally for measuring a circumference of the test piece on the circumference measuring stage, and
a subsidiary transfer mechanism for laterally delivering the test piece from the weighing stage of the weight measuring section and for transferring the test piece onto the circumference measuring stage of said circumference measuring section;

a second measuring section, having a second measuring stage comprised of ventilation vessel which is placed horizontally and adapted to form airtight chambers, for making a measurement on a ventilation characteristic as a second test item for the test piece, with the test piece held horizontally in the ventilation vessel;

a third measuring section having a third measuring stage on which the test piece is held horizontally for making a measurement on a third test item for the test piece, said test piece held on the third measuring stage, and wherein the third measuring section includes a length/hardness measuring section for measuring a length and hardness of the test piece on a length/hardness measuring stage which is place horizontally, and the first transfer section transfers the test piece from the circumference measuring stage to said second measuring section, and wherein said length/hardness measuring section comprises a regulating member movably disposed relative to said length/hardness measuring section for regulating a position of one end of the test piece on the length/hardness measuring stage, and a sensor for optically detecting a position of another end of the test piece which is placed on the length/hardness measuring stage, the position of the one end of the test piece regulated by the regulating member in accordance with a moving position of the regulating member, to thereby measure the length of the test piece;

a first transfer section for horizontally transferring the test piece from said first measuring section to said second measuring section; and a second transfer section for horizontally transferring the test piece from said second measuring section to said third measuring section.

2. The rod-shaped test-piece testing apparatus according to claim 1, wherein said length/hardness measuring stage includes a pair of revolving rollers horizontally disposed in parallel with each other, said pair of revolving rollers being disposed to be axially aligned with said ventilation vessel constituting said second measuring stage.

3. The rod-shaped test-piece testing apparatus according to claim 1, wherein said test piece is a cigarette.

4. The rod-shaped test-piece testing apparatus according to claim 1, wherein said first and second transfer sections transfer the test piece with use of pressurized air.

5. The rod-shaped test-piece testing apparatus according to claim 1, wherein said third measuring section includes a movable member disposed to be movable relative to said length/hardness measuring stage, said regulating member being mounted to said movable member.

6. The rod-shaped test-piece testing apparatus according to claim 5, wherein a position at which said regulating member is mounted to said movable member is adjustable.

* * * * *